United States Patent Office 2,701,902
Patented Feb. 15, 1955

2,701,902

METHOD OF MAKING MOLDS

Mark Noel Strachan, Llangollen, Wales, assignor, by mesne assignments, to Monsanto Chemicals Limited, London, England, a British company No Drawing. Application December 12, 1949, Serial No. 132,629

Claims priority, application Great Britain December 13, 1948

5 Claims. (Cl. 22—196)

This invention relates to the method of casting metals known as the investment casting process.

In this process a replica (or pattern) is made of the casting required, and this is embedded in a slurry or mix of a refractory substance and a solution of ethyl silicate or an analogous bonding agent. This slurry or mix is known as the "investment." The investment is then allowed to set round the pattern by gelling of the ethyl silicate, after which the pattern is removed leaving a mould which is ready to be fired. The ethyl silicate will of course slowly hydrolyze and gel if the amount of water present is above a small proportion, so that the investment on standing becomes solid owing to the hydrolysis of the ethyl silicate to form a silica gel. Other substances than ethyl silicate can be used having a similar effect, for instance ethyl phosphate or certain colloidal solutions of silica.

In some cases the pattern can be used more than once and the mould if necessary cut away from the pattern in sections.

A more important method of operation is by the so-called "lost wax" process, by means of which castings of high precision can be obtained. In this particular process the pattern is made from wax for instance, and is removed from the solidified investment surrounding it by heating the mass and melting the wax, leaving a mould which can then be fired. It is not altogether necessary to use wax, and substances such as fusible plastics are also suitable; the term "lost wax" is employed in this specification to mean any instance where the pattern is removed by melting.

Various slurries or mixes can be used in the process as the investment, and a mixture of alumina, silica and magnesia bonded together by an aqueous alcoholic solution of ethyl silicate has been found very satisfactory. An aluminum silicate or sillimanite refractory can similarly be used. A suitable investment can for instance be prepared by mixing a composition of the type

|  | Per cent |
|---|---|
| High alumina firebrick | 72.5 |
| Silica flour | 27.4 |
| Magnesia | 0.1 | in powder form with a liquid bonding material of the constitution

|  | Per cent |
|---|---|
| Methylated spirits | 67 |
| Ethyl silicate | 27 |
| Hydrochloric acid (7.5%) | 1 |
| Water | 5 | in the proportions of 20 pounds of the solid refractories to 0.6 gallon of the liquid bonding material. The mixture produced can readily be poured round a wax replica of the casting in a moulding box, and on vibration will pack itself round the wax. After standing for some hours the ethyl silicate will have gelled, after which the wax can be removed by heating and the mould fired. Thus the mould might perhaps be heated to about 150° C. for say six hours in the first instance and then fired at a high temperature.

There is a certain difficulty in processes of this kind in obtaining a smooth and accurate surface to the mould, and thus an accurate casting, and this difficulty can be overcome by spraying the wax or other pattern with a solution of sodium silicate acidified by hydrochloric acid before introducing the investment round it. In practice a quantity of a refractory filler such as powdered flint is added to the solution, and on drying a siliceous film remains round the pattern and forms a surface to the mould structure when the investment referred to above sets hard.

The function of the hydrochloric acid is possibly to cause some measure of gelling when the solution is dried and thus to improve the quality of the surface. If it is omitted the result is inferior. However, its use involves the consequence that the final layer contains sodium chloride, and this has the disadvantage when a metal of high-melting point is being cast (a high-melting point alloy, for instance) that the sodium chloride is liable to melt during the casting.

The present invention is concerned with the use of a silicate solution which is a marked improvement, and which is free from this disadvantage.

According to the invention, the wax or other pattern before applying round it the investment referred to above is sprayed or otherwise coated with a solution of an organic or inorganic silicate to which has been added (or in which has otherwise been incorporated) a colloidal solution of silica.

The most convenient silicate to use is sodium silicate, and among the organic silicates ethyl silicate is very suitable. The colloidal solution of silica is preferably aqueous, though it may be a colloidal solution in an organic medium. In practice, the invention is best carried out using a mixture of an aqueous solution of sodium silicate and an aqueous colloidal solution of silica.

It has been found that such a solution on drying will readily form a smooth surface adjacent to the pattern and provide a good surface to the final mould. It may possibly be that the effect of using the colloidal solution of silica is to replace the hydrochloric acid in a solution of the type referred to earlier in this specification by a form of silica somewhat analogous to that formed by the reaction of the acid with the sodium silicate present, so that the result is achieved without the formation of sodium chloride.

Preferably a refractory filler is mixed with the solution which is sprayed or otherwise applied to the pattern, and finely-divided flint powder is particularly suitable. Other examples of suitable fillers are zirconia, silica, alumina and sillimanite.

The colloidal solution of silica used can be one of those described in the following U. S. patents: No. 2,285,449, issued June 9, 1942; No. 2,285,477, issued June 9, 1942; No. 2,375,738, issued May 8, 1945; No. 2,443,512, issued June 15, 1948; No. 2,515,949, issued July 18, 1950; No. 2,515,960, issued July 18, 1950, and No. 2,515,961, issued July 18, 1950. Especially good results have been obtained using the aqueous colloidal solution sold under the registered trade-mark "Syton." The solution known as "Syton W-20," which is a 15%-colloidal aqueous solution of silica by weight, is very suitable.

The invention is illustrated by the following example:

Example

A wax pattern to be used in forming a mould in the "lost wax" process of casting was sprayed with a composition of the following constitution:

| | |
|---|---|
| Sodium silicate solution cc | 225 |
| Colloidal silica solution cc | 30 |
| Water (containing 0.8% soap in solution) cc | 450 |
| Powdered flint (passing 200 mesh B. S. S. sieve) grams | 1,400 |

The sodium silicate solution used was an aqueous solution containing about 29% SiO$_2$ and 9% of Na$_2$O, and the colloidal silica solution was a 15% aqueous solution by weight (Syton W-20).

In order to prepare the composition the sodium silicate solution was placed in a suitable vessel and the water containing the soap in solution was added. The mixture was stirred until it was homogeneous, and the colloidal silica solution was added with stirring. Finally the powdered flint was added in several portions and the composition well mixed.

The composition was sprayed on the wax pattern using a spraying gun of standard type in a spraying booth. After a thin continuous coating had been formed over the pattern it was allowed to dry in the air, after which the pattern was attached to a base plate, fixed in a moulding box and surrounded with an ethyl silicate investment of the composition described earlier in this specification.

The mould was then formed in the manner also described earlier.

What is claimed is:

1. A method of preparing moulds in accordance with the investment casting process, which comprises coating the pattern, before application of the investment, with an aqueous solution of an inorganic silicate in which a colloidal solution of silica has been incorporated.

2. A method according to claim 1, in which a wax pattern is used.

3. A method according to claim 1, in which the silicate used is sodium silicate.

4. A method according to claim 1, in which a powdered refractory filler is mixed with the solution applied to the pattern.

5. A method of preparing moulds in accordance with the "lost wax" process of casting, which comprises spraying the fusible pattern, before application of an investment comprising ethyl silicate, with an aqueous solution of sodium silicate in which has been incorporated an aqueous colloidal solution of silica, and with which has been mixed a powdered refractory filler, said aqueous solution of sodium silicate being present in a greater volume than the volume of the aqueous colloidal solution of silica incorporated therein.

References Cited in the file of this patent

UNITED STATES PATENTS

| | | |
|---|---|---|
| 1,909,008 | Prange | May 16, 1933 |
| 2,027,932 | Ray | Jan. 14, 1936 |
| 2,058,844 | Vaughn | Oct. 27, 1936 |
| 2,195,452 | Erdle | Apr. 2, 1940 |
| 2,380,945 | Collins | Aug. 7, 1945 |